United States Patent [19]

Boggan et al.

[11] Patent Number: 4,822,985
[45] Date of Patent: Apr. 18, 1989

[54] TRANSACTION APPROVAL SYSTEM

[75] Inventors: Elvis W. Boggan, Concord, Calif.; Carl M. Campbell, Jr., Newtown Square, Pa.

[73] Assignee: Visa International Service Association, San Mateo, Calif.

[21] Appl. No.: 596

[22] Filed: Jan. 6, 1987

[51] Int. Cl.⁴ .............................................. G06K 5/00
[52] U.S. Cl. .................................................. 235/380
[58] Field of Search ..................... 235/380, 382, 382.5, 235/379; 380/24

[56] References Cited

U.S. PATENT DOCUMENTS 3,696,335 10/1972 Lemelson .
4,186,871 2/1980 Anderson et al. ..................... 380/24
4,472,626 9/1984 Frid ...................................... 235/380
4,558,211 12/1985 Berstein .
4,679,236 7/1987 Davies ................................. 235/380

Primary Examiner—Roy N. Envall, Jr.
Attorney, Agent, or Firm—Limbach, Limbach & Sutton

[57] ABSTRACT

An improved system is disclosed for detecting invalid transaction cards at remote transaction terminals. The system includes providing each terminal with a master table having data corresponding to invalid cards. The data in the master table is less than the actual account numbers of the invalid cards. By using a compressed version of the data, the file can be shortened to facilitate storage and transmission. The compressed data file is arranged such that when an invalid card is presented, it will be identified and routed on for further processing. In the preferred embodiment, the probability that a valid card will be identified as potentially invalid is on the order of one of three percent.

29 Claims, 3 Drawing Sheets

BIT MAP

| BIT | 1 | 2 | 3 | 4 | 5 |
|---|---|---|---|---|---|
| 0 | 0 | 1 | 0 | 1 | 0 |
| 1 | 0 | 0 | 1 | 1 | 0 |
| 2 | 1 | 1 | 0 | 1 | 1 |
| 3 | 1 | 0 | 1 | 0 | 1 |
| 4 | 0 | 0 | 1 | 1 | 1 |
| 5 | 1 | 1 | 0 | 0 | 1 |
| 6 | 0 | 1 | 1 | 0 | 1 |
| ... | | | | | |
| B-3 | 0 | 0 | 1 | 1 | 0 |
| B-2 | 1 | 0 | 0 | 1 | 1 |
| B-1 | 0 | 1 | 1 | 0 | 1 |

| ACCOUNT NUMBER | 0 | 3 | 5 | 8 | 2 | 3 | 1 | 4 | 2 | 7 | 8 | 7 |
|---|---|---|---|---|---|---|---|---|---|---|---|---|
| POSITION | 12 | 11 | 10 | 9 | 8 | 7 | 6 | 5 | 4 | 3 | 2 | 1 |

FIG. 3

TRANSACTION APPROVAL SYSTEM

TECHNICAL FIELD

The subject invention relates to a financial transaction network. The invention includes an improved system for distributing information about invalid transaction cards.

BACKGROUND OF THE INVENTION

In the last fifteen years the use of transaction cards as substitutes for cash has greatly expanded. Along with this expanded use has come an increase in losses due to fraud. One of the most costly problems is caused by the use of invalid cards. The term invalid card includes those cards which have been lost or stolen. The term can also include cards whose credit limits have been exceeded by the holder. Significant efforts have been made to minimize the use and abuse of invalid cards.

One of the earliest approaches used to combat this fraud was to distribute a printed list of invalid cards. One such list is called the Card Recovery Bulletin or CRB. In use, the merchant checks the account number on the card presented for the transaction with the account numbers printed in the CRB. If the account number is listed, the transaction would be declined.

This use of the CRB is effective in reducing a large percentage of fraud losses. Unfortunately, this approach has a few drawbacks. For example, a transaction card is often used almost immediately after it has been lost or stolen. This immediate use will occur before the card has been listed in the bulletin or before the bulletin has been distributed. Another problem with this approach is that from a practical standpoint, it is often difficult to insure that store clerks use the list properly or at all.

Because of these difficulties, many other more sophisticated approaches have been taken. One of the most effective schemes is to authorize every transaction through a real-time, on-line communications network. For example, the merchant can report the account number of the card presented for a transaction to a central processor by telephone. The account number on the card can then be checked against a current list of invalid card numbers stored either at the central processor or back at the card issuer. In another variation on this scheme, a transaction terminal is provided with a card reader which reads a magnetic stripe encoded with an account number. The terminal can then automatically transmit the account number to the central processor for approval.

This on-line scheme eliminates the lag time inherent in using the Card Recovery Bulletin. Unfortunately, a fully on-line system turns out to be prohibitively expensive and prone to communication delays. An on-line approach also does not provide any protection when the network is down.

More recently, many approaches have been taken to reduce transaction approval costs while also controlling fraud losses. As microprocessors become smaller, cheaper and faster, some of the transactional analysis can be performed at the terminal itself. Efforts have been made to develop screening procedures that avoid having to transmit the transaction information to the central processor. For example, the transaction terminal can be programmed to authorize every transaction below a certain dollar limit or floor limit. In this manner, the cost of communication can be balanced against the risk of loss.

The terminal may also be provided with the capability to verify a cardholder secret personal identification number or PIN. In this scenario, a version of the PIN is encoded onto the magnetic stripe on the card and read by the terminal. The terminal then compares the PIN read from the card with a PIN entered into a keypad on the terminal by the cardholder. If the two PINs match, the transaction can be approved. The use of PINs sharply reduces the fraudulent use of lost or stolen cards.

A more sophisticated approach is described in copending U.S. patent application Ser. No. 730,309, filed May, 2, 1985, assigned to the same assignee as the subject invention and incorporated herein by reference. In this patent application, a system is described wherein risk assessment data is encoded onto the card by the card issuer. This risk assessment data is tailored to define the credit worthiness of each specific cardholder. This risk assessment data can be analyzed by the transaction terminal and if the transaction amount falls within the parameters encoded on the card by the issuer, the transaction can be automatically approved. If the transaction amount exceeds these parameters, the transaction information is routed on to the central processor for further analysis.

As the cost of computer memory space has decreased, the idea of storing the account numbers of invalid cards in each transaction terminal has been explored. If this scheme were implemented, the account number of the card being presented for the transaction could be automatically compared at the terminal. One prior art system which utilized this approach is described in U.S. Pat. No. 3,696,335, issued Oct. 3, 1972 to Lemelson.

The approach illustrated in the Lemelson patent has been deemed impractical for a number of reasons. More specifically, in order to keep the lists current, they would have to distributed to the terminals and updated on a frequent basis. With the number of transaction terminals rapidly expanding, it would be virtually impossible to physically transfer this data to the terminals on a routine basis. Therefore, distribution of the list of invalid account numbers must be through some type of communication link. Unfortunately, the lists of invalid cards are so large for the major transaction card systems that on-line distribution becomes quite difficult. However, if some way could be developed to distribute the list in an efficient manner, this approach could be very effective in reducing both communication costs and fraud losses.

One technique for attaining this goal is described in U.S. Pat. No. 4,558,211, issued Dec. 10, 1985 to Berstein. This disclosure acknowledges that a complete "hot card" list would be too large to transmit to each transaction terminal. The solution proposed in the latter patent is to add an identifier to each listed hot card which indicates the geographical location in which the card is most likely to be used. Subsets of the hot card list geared to specific geographical locations can then be generated. The greatly shortened lists can then be distributed to the terminals and stored. The patent suggests that a standard 4K byte memory in a terminal could hold a list of 800 invalid cards. Since most invalid cards are used in the area where they were lost or stolen, this approach could be very effective as long as only 800 invalid cards exist in any geographical area.

Unfortunately, major transaction card companies will typically have over one million invalid cards listed on any given day in the United States alone. Even when these lists are broken down geographically, the size of the smallest list does not fall much below 100,000 cards. Obviously, if the geographical area is made too small, the effectiveness of the system will be reduced since it will be limited to catching an unauthorized user only at the exact location the card was lost or stolen.

Accordingly, it is the object of the subject invention to provide a new system for distributing information about invalid cards.

It is another object of the subject invention to provide a new system for distributing lists of invalid cards which can be used to authorize transactions at a transaction terminal.

It is a further object of the subject invention to provide a new system for distributing lists of invalid cards in a cost effective manner.

It is still another object of the subject invention to provide a new system for rapidly distributing lists of invalid cards in an on-line manner.

It is still a further object of the subject invention to provide a new data file containing information about invalid cards that takes up very little memory space.

It is still another object of the subject invention to provide a compressed data file that can be easily transmitted to remote transaction terminals.

It is still a further object of the subject invention to proved a compressed data file which will always indicate when an invalid card has been presented and wherein the probability of identifying a valid card as a potentially invalid card is on the order of one to three percent.

It is still another object of the subject invention to provide a hot card authorization system that can easily be implemented in current microprocessor based remote transaction terminals.

It is still a further object of the subject invention to provide a compressed data file with information on an invalid transaction that is arranged in a manner such that the entire file does not have to be searched in order to determine if a particular account number is invalid.

SUMMARY OF THE INVENTION

In accordance with these and many other objects, the subject invention provides for a method for generating and distributing a master table containing information about invalid cards. A unique data compression method is used to substantially reduce the amount of memory needed to hold the master table. By reducing the size of the file, the downloading of the information to local transaction terminals is greatly facilitated.

The information contained in the master file is less than the actual account numbers of the invalid cards. Nonetheless, the data is so arranged that if an invalid card is presented to a transaction terminal, it will always be identified as requiring further analysis prior to approval. If the card is so identified, the account information can then be transmitted to a central processor for final confirmation against a complete invalid card list. Conversely, if an account number is tested against the master file at the transaction terminal and is cleared, the transaction can safely be approved off-line since this result insures that the account number is not listed in the invalid card file.

Because of the characteristics of the data compression system of the subject invention, a certain percentage of valid cards which are presented will be identified as potentially invalid. In such cases, the information about the transaction will be passed on to the central processor for absolute verification. The probability of a valid card being identified as potentially invalid can be adjusted by varying the characteristics of the master table. The probability of a valid card being identified as potentially invalid should be less than ten percent and preferably on the order of one to three percent. Since many transactions are transferred to the central processor for other reasons (i.e. high dollar amount transactions which exceed the floor limit of the terminal), the fact that a small percentage of transactions are sent to the central processor under this scheme will have an insignificant impact on overall system performance.

The master table is defined by a plurality of bit maps. As discussed in detail below, by using a plurality of bit maps in the master table instead of just one, the probability of a valid card being identified as potentially invalid can be reduced. Conversely, as the number of bit maps is increased, processing time is also increased.

Each of the bit maps in the table is B bits in length. Information about the invalid cards is represented by indicators within the bit map. In order to set the indicators, the account number of the invalid card is subjected to an algorithmic function to generate an index value between zero and the number of bits in the bit map. When this value is obtained, an indicator is placed in the location in the bit map corresponding to the index value that is generated. In the illustrated embodiment, where five bit maps are used, the account number is subjected to five different algorithmic procedures to generate five different index values, each of which is used to place an indicator in one of the five bit maps.

The algorithm used to generate an index value may be relatively sophisticated, such as the data encryption standard (DES). For greater speed and simplicity, selected digits of the account number can be mixed and added to generate an index value. The process of mathematically reducing the information content in a data stream is typically called "hashing".

The selected hashing procedures are repeated for each of the invalid cards on the list. When the table is complete, it is distributed to the transaction terminals. In the preferred embodiment, this list is downloaded by radio transmission to all terminals simultaneously. This list can be downloaded through any other suitable type of communication link.

In operation, the account number of the card presented for the transaction is read into the terminal. The terminal then performs the same algorithmic steps, or, hashing on the new account number that was done to create the table in the first place. An index value is generated for each bit map. The transaction terminal then determines if an indicator is present in each bit map in the master table corresponding to each of the newly generated index values. If any bit map does not contain an indicator, then the card is immediately known to be valid and the transaction may be approved offline. If the comparison reveals that the indicators are present in every bit map, then there is a possibility that an invalid card has been presented. In this case, some form of further processing will be required. At that point, the transaction may be routed to the central processor for an absolute comparison of the account numbers against the entire list of invalid cards. If the transaction system happens to be down, a message may be relayed to the operator that the account number should be checked against a printed list. As pointed out above, the terminal will identify some small percentage of valid cards as potentially invalid but the results of further processing will indicate that those cards so identified are in fact valid and that the transaction should proceed.

It is estimated that a master table generated with the subject data compression system will be one-fourth to one-sixth the length of a list of actual invalid account numbers. This shorter file can be more easily transmitted and stored. Another advantage to this approach is that the entire table does not have to be scanned to determine if a card is valid. The index values are used to pinpoint specific locations in the table. As soon as such a location is encountered in which no indicator is present, the card in question is immediately known to be valid.

BRIEF DESCRIPTION OF THE DRAWINGS

FIG. 2 is a representation of a master table having five bit maps.

FIG. 3 is a representation of the last 12 digits of an invalid account number.

DETAILED DESCRIPTION OF THE PREFERRED EMBODIMENT

Figure 1:
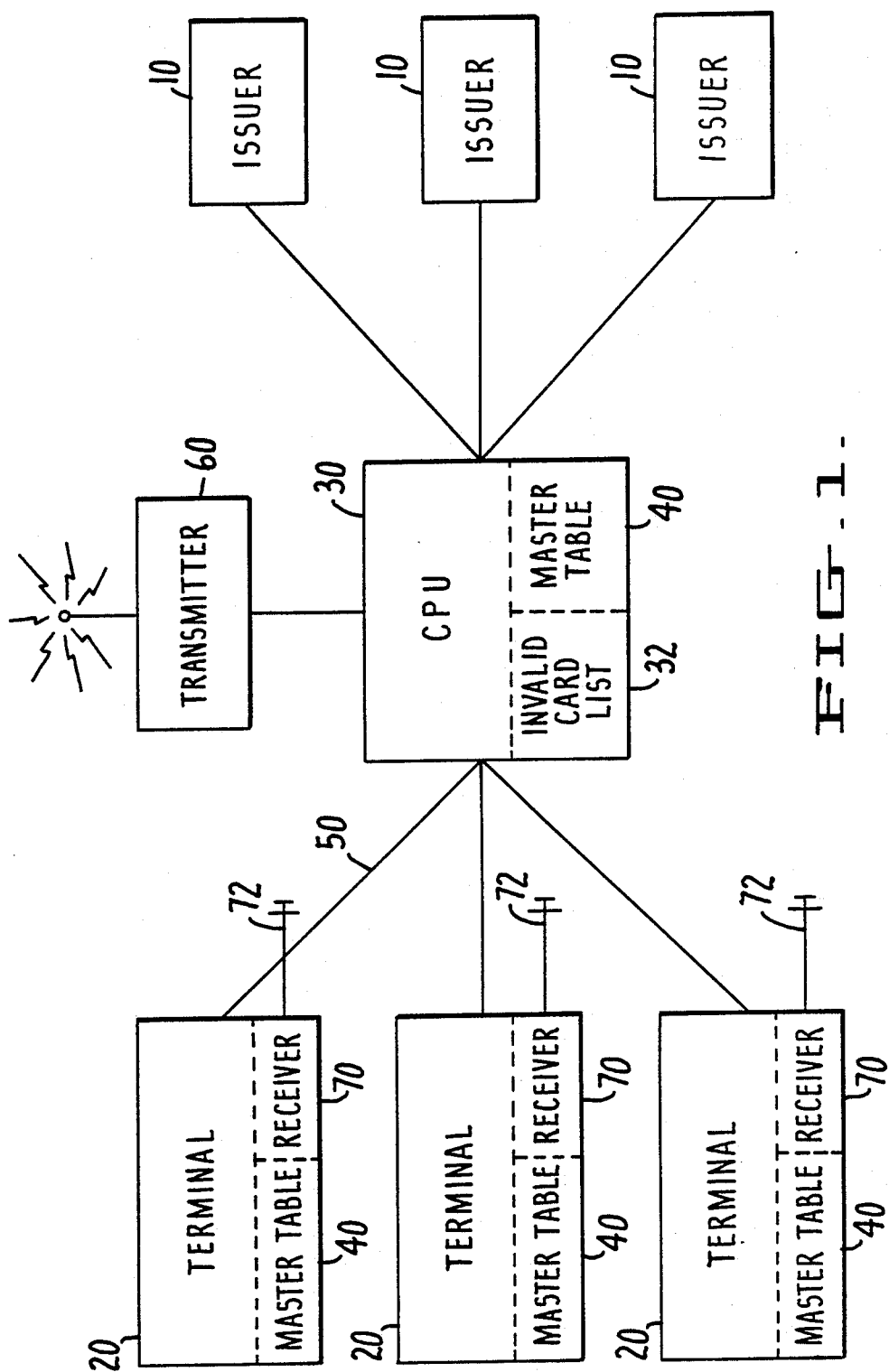
FIG. 1 is a schematic diagram illustrating a transaction network where the method of the subject invention can be implemented.

Referring to FIG. 1, there is illustrated a transaction network in which the subject invention may be implemented. As shown in FIG. 1, a transaction network typically will include one or more issuers 10 of transaction cards. The transaction cards are distributed to customers and will include an account number identifying the cardholder. The cards are presented to merchants for goods and services in lieu of cash.

The transaction is frequently authorized through the use of transaction terminals 20. There are a large number of transaction terminals publically available and therefore they will not be described in detail herein. The current state of the art transaction terminal typically includes a card reader for reading account information and other data from the magnetic stripe on the transaction card. The terminal can also be provided with the ability to automatically dial and make an online connection to a computer located either at a merchant bank, a network switch or to one of the card issuers. For the purposes of this disclosure, block 30, labelled "CPU," is intended to correspond to a central processing unit having higher level decision-making authority. For example, the central processing unit 30 can have stored therein a full list of invalid cards 32 which may be consulted to determine if the transaction should be approved.

As discussed above, the transaction terminal 20 may be provided with the ability to perform some transactional analysis without connection to the main CPU 30. To carry out these functions, the terminals will include a microprocessor, dedicated ROMs, random access memories, a keypad and display. In order to perform the subject invention, some dynamic memory space must be allocated for holding the master table 40. In addition, a program must be provided for analyzing the account number presented with the data in the master table. The programming of a terminal to perform these functions is well within the abilities of one skilled in the software development art.

In accordance with the subject invention, the terminal 20 is capable of determining whether a card, presented for a transaction, is likely to be invalid. This result was achieved in the above cited U.S. Patents. In the prior art systems, actual invalid account numbers are supplied to each transaction terminal. The account number of the card presented is compared to the account numbers listed in the memory to determine if the transaction should be approved. In contrast, in the subject invention, a master table containing information less than the invalid account numbers is generated and supplied to the terminals. In this manner, meaningful data can be stored in less space. In addition, only precise locations in the table are searched to determine if the card is invalid.

In accordance with the subject invention, the information on the invalid cards is contained in a master table 40 generated at the central processor 30. An example of a master table 40 is shown in detail in FIG. 2. The master table consists of at least one bit map of B bits in length. Preferably, a plurality of bit maps are used. As will be seen below, by using a plurality of bit maps in the master table instead of just one, the probability of a valid card being identified as potentially invalid is decreased. In the illustrated embodiment of FIG. 2, five bit maps are used.

When selecting the length of the bit map, consideration should be given to maximizing the information content within the map. From a statistical analysis, it can be shown that greatest information content in a bit map occurs when roughly half the bits are zero and half the bits are one. Assuming that the algorithmic functions used to generate the table provide results with pseudo-random characteristics, the fraction of bits in a bit map which are zero is given by the following equation:

$$Z = [1 - (1/B)]^N \qquad (1)$$

where Z is the fraction, B is the number of bits in the map and N is the number of invalid cards listed. Where each bit map is 200,000 bits in length, a distribution profile where half the bits are zero and half the bits are one (Z=0.5) would occur when about 138,000 account numbers are listed. In the illustrated embodiment, where roughly 100,000 cards are initially listed, the probability of any bit being a one is on the order of 0.4. In operation, as account numbers are added to the master table through an update procedure discussed below, the information content in the bit map will increase as the probability increases to 0.5.

In order to generate the table, the account numbers of the invalid cards are "hashed" to derive compressed data. An account number can be hashed by encrypting the number using the data encryption standard (DES) and a secret key. The resulting number can be truncated to an index value between zero and B-1. An indicator, (for example, a "one" if all the bits are originally set to "zero") can then be placed in the bit map at the location corresponding to the index value which has been generated by the algorithmic function. If more than one bit map is used, the account number could be encrypted again, using a different key. The result is truncated to obtain another index value which will be used to place an indicator in the second bit map. This process would be repeated, encrypting the account number one time for each bit map present in the master table. Each invalid card would then have one indicator in each of the bit maps. Similar steps would be performed for each invalid card, and indicators would be added into the table. If an indicator was already located at an index value from a previous card, this indicator would remain unchanged.

While the data encryption standard (DES) provides a method of hashing account numbers which has suitable pseudo-random characteristics, it is also time-consuming and complex. In the illustrated embodiment, a simpler and faster hashing algorithm is described which has an acceptable degree of pseudo-random characteristics. In this context, a pseudo-random algorithmic function will insure that any index value generated from the account number will have an equal probability of lying anywhere in the bit map. Furthermore, the results of the algorithmic function used with one bit map should not correspond in any way to the results of the algorithmic function used t generate a different bit map.

In the illustrated embodiment, these factors are balanced by selecting and combining small groups of digits in the account number to create index values. This approach can best be understood by referring to FIG. 3 and the tables below. FIG. 3 illustrates the last 12 digits of an account number 0358-2314-2787. The position of these digits has been labelled 1 to 12, from right to left. Where the bit map has 200,000 entries, index values between 0 and 199,999 must be generated. The most significant digit of that six-digit index value must be either a one or a zero. The remaining five digits must be between 0 and 9.

The first index value which will be used to place an indicator in the first bit map in FIG. 2, can be generated using Table I, which is merely intended to illustrate a suitable hashing function.

TABLE I

| INDEX VALUE DIGIT | ACCOUNT NUMBER POSITIONS | CORRESPONDING ACCOUNT DIGITS | INDEX VALUE |
|---|---|---|---|
| 1 | (4 & 5) | (2 + 4) | 0 |
| 2 | (1, 7 & 8) | (7 + 3 + 2) | 2 |
| 3 | (2, 4 & 9) | (8 + 2 + 8) | 8 |
| 4 | (2, 5 & 10) | (8 + 4 + 5) | 7 |
| 5 | (3, 6 & 11) | (7 + 1 + 3) | 1 |
| 6 | (3, 7 & 12) | (7 + 3 + 0) | 0 |

As seen from Table I above, the first digit is derived based upon whether the sum of two digits in the account number is even or odd. In this example, in index digit 1, the two account number digits selected (2, 4) are in the fourth and fifth position. Since 2 plus 4 is even, the first digit of the index value will be 0. Digit 2 of index 1 is the modulo 10 summation of the account number digits located at positions 1, 7 and 8, namely, 7, 3 and 2. The sum of 7+3+2 equals 12, with the modulo 10 sum being 2, such that digit 2 of the index value is 2. Similarly, digit 3 is the modulo 10 sum of 8+2+8 (positions 2, 4 & 9), which is equal to 8. Therefore, the third digit in the index is 8. The remaining digits are calculated in a similar manner to yield digits 7, 1 and 0. When read together, the index value for the account number in FIG. 3 is 028170. An indicator will then be placed in the first bit map at the 28,170th bit. If an indicator is already present at that bit from a previous table entry, no change will be made.

Similar index values are then calculated for each of the bit maps present in the master table. In the preferred embodiment with 5 bit maps, another four index values will be generated. A table will be used for each index value that is similar in structure, but different in content to the table illustrated above. The index digits selected for the tables will preferably be as different from each other as possible.

A second table (Table II) is set forth below as another illustrative example:

TABLE II

| INDEX VALUE DIGIT | ACCOUNT NUMBER POSITIONS | CORRESPONDING ACCOUNT DIGITS | INDEX VALUE |
|---|---|---|---|
| 1 | (2 & 6) | (8 + 1) | 1 |
| 2 | (4, 5 & 8) | (2 + 4 + 2) | 8 |
| 3 | (1, 3 & 9) | (7 + 7 + 8) | 2 |
| 4 | (3, 5 & 10) | (7 + 4 + 5) | 6 |
| 5 | (2, 7 & 11) | (8 + 3 + 3) | 4 |
| 6 | (4, 6 & 12) | (2 + 1 + 0) | 3 |

When the account number shown in FIG. 3 (0358-23-14-2787) is hashed in accordance with the algorithm of Table II, an index value of 182,643 is generated. An indicator would then be placed in the 182,643rd bit of the associated bit map.

By generating a master table in this fashion, an indicator will be placed in each bit map for each invalid card. When the table is used to detect an invalid account number (a process described in greater detail below) an indicator must be present in each bit map tested, otherwise the card is known to be valid. The converse of this statement is not true. More specifically, even if an indicator is present in each bit map, the card might still be valid. As can be appreciated, as more invalid cards are listed in the table, and more indicators are added to the bit map based on the results of random algorithmic functions, the likelihood that indicators will be present for the index values obtained by hashing any account number will increase.

The probability that an unlisted valid account number will be identified as potentially invalid is given by the following formula:

$$P = [1 - (1 - 1/B)^N]^M \qquad (2)$$

where P is equal to the probability, B is equal to the number of bits in each map, N is equal to the number of listed account numbers, and M is equal to the number of bit maps. In the arrangement shown herein, where five bit maps are used, each 200,000 bits long, if 200,000 account numbers are listed, the probability of a valid card being identified as potentially invalid would be on the order of 10.1 percent. If the file is reduced to 100,000 account numbers, the probability of identifying a valid card as potentially invalid drops to just below one percent.

The probability of identifying a valid card as potentially invalid can be varied by changing the total number of bit maps in the master table. Assuming that the length of the bit map has been adjusted to maximize information content (as discussed above) the probability that a valid account number will be identified as potentially invalid is given by the following equation:

$$P = \tfrac{1}{2}^M \qquad (3)$$

This equation demonstrates that when five bits maps are used, the probability of identifying a valid card as potentially invalid is 1 in 32 or about 3.1 percent. In the illustrated embodiment, where only 100,000 cards are initially listed, the bit maps are not utilized to their full information carrying capacity and the probability of identifying a valid card as potentially invalid is just under one percent as noted above.

From a purely statistical analysis, if 100,000 invalid cards are to be listed in a master table one million bits long, seven bit maps should be used. To implement such a master table, a hashing algorithm which will randomly distribute information within seven bit maps, each 142,857 bits long, must be created. For practical reasons, five bit maps were selected for this illustration since a suitable hashing algorithm could be created more readily. Furthermore, while the use of five bit maps instead of seven in the master table will result in an increase in the percentage of valid cards that are identified as potentially invalid, this increase is relatively small and not considered unacceptable. Finally, the use of five bit maps allows the number of listed account numbers to increase to about 140,000 with the probability of identifying a valid card as potentially invalid increasing to only about 3.25 percent.

The effect of the subject data compression system can be compared with listing the actual account numbers in a memory. For the comparison, the least 12 significant digits of the account number are selected. Each 12 digit account number would require 48 bits of memory, assuming four bits per digit in a binary coded decimal format. In contrast, in the subject system, reasonable operation is achieved when the number of bits in the master table is roughly seven to ten times greater than the number of invalid account numbers to be listed. This represents a reduction in memory needs by roughly factor of five and balances the competing factors of limited memory and information content.

In practice, the list of invalid cards used to generate the table can also be trimmed with respect to the geographical location of the invalid cards in a manner similar to that described in the Berstein patent. However, rather than distributing these reduced lists as called for in the Berstein patent, the lists are used to generate a plurality of master tables which are then distributed geographically. In this manner, the total list of invalid cards, which may exceed one million in the United States alone, can be broken into regional subsets having a length on the order of 100,000 cards each. This master table can be one million bits or 125 K-bytes long. 128K dynamic RAM memories are readily available at relatively low cost and can easily store this size master table. More importantly, the reduced size of the master files simplifies and shortens the time necessary to transmit the information to the terminals.

The transmission of the master table to each individual terminal could be done along the same type of communication lines used to interconnect the terminal and the central processor unit for on-line authorizations. These lines are shown as 50 in FIG. 1. In this approach, a communication protocol must be established with each terminal to send the information. In the preferred embodiment of the subject invention, the master table 40 is broadcast over radio waves to the terminal. As shown in FIG. 1, the CPU is connected to a transmitter 60. Transmitter 60 generates radio waves which are received by the antenna 72 of radio receiver 70 provided in each terminal. The information received by the receiver is downloaded into memory in each terminal. Information on radio waves can be readily transmitted at 38,400 bits per second such that the entire one million bit master file could be transmitted in less than one-half a minute. This file could be generated and transmitted once a day so that the most current information on invalid cards is available to the terminals.

If less frequent transmission of the entire master table is desired, the table can be updated with additions. For example, if the master table is transmitted weekly, updates could be transmitted on a daily basis. In this case, lists of additional invalid cards could be supplied to each terminal. Each newly transmitted invalid account umber would be hashed by the individual terminal and indicators would be placed into the bit maps of the master table.

If the system is operated in a manner where a significant number of new entries are typically supplied to the terminal prior to retransmitting an entirely new master table, steps can be taken to reduce the transmission time of the updates. For example, when the table is initially created, each twelve digit account number could be "prehashed" to yield a seven digit number. This seven digit number would then be hashed to create index values in a manner similar to that described above. If the master table is created in this manner, only the seven digit, prehashed account numbers, rather than the full twelve digit numbers, would have to be supplied to the transaction terminals when the master table is updated. This approach would shorten transmission time by almost one-half.

It should be noted that while individual account numbers can be added to the master table, individual account numbers cannot be deleted. As can be appreciated, any time a file is created by data compression, there will be duplicates or overlapping entries. Therefore, even if a particular card has regained valid status (or the listing period has expired), the indicators could not be safely removed from the file without unintentionally destroying other meaningful data.

Effective deletion of account numbers can only be achieved by transmitting a newly generated master file. Transmission of a new master file should occur before the number of account numbers listed in the file, as increased by updates, reaches a level where an unacceptable percentage of valid cards are being identified potentially invalid.

Figure 4:
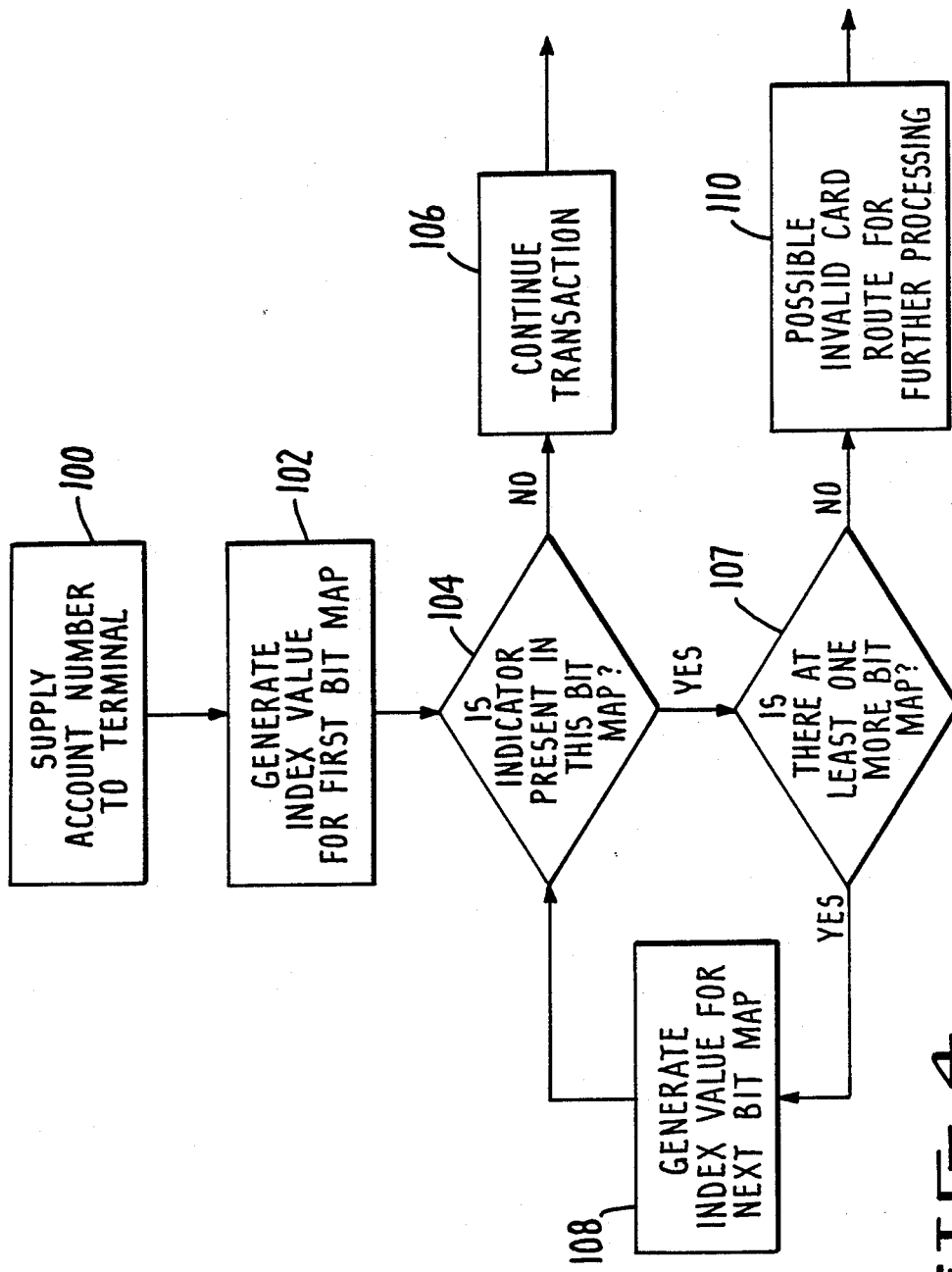
FIG. 4 is a flow chart illustrating the steps taken at the transaction terminal in accordance with the subject invention.

Having described the generation and transmission of the master table to the transaction terminals, the use of the master table at the transaction terminal will now be discussed with reference to the flow chart of FIG. 4. At the time of a purchase, a cardholder will present his transaction card to a merchant. The account number of the card is then supplied to the transaction terminal, as shown in step 100 in FIG. 4. The processor in the transaction terminal can then generate index values for each bit map in a manner exactly equivalent to the algorithms used to generate the master table.

Assuming the hashing system described above has been used to create the master table, the first digit of the first index value will be defined by whether the sum of digits in positions 4 and 5 are odd or even. The remaining five digits of the first index value will be the modulo sum of each group of three selected digits. After the first index value is generated (step 102), the processor will look into the first bit map of the master table to determine if an indicator has been placed at the location defined by the index value(step 104). If there is no indicator at that location in the first bit map, the analysis is complete and the transaction can be allowed to continue (step 106).

Step 106 is intended to represent the next set of steps to which the transaction would normally be subjected. For example, the transaction amount could be compared to a dollar limit stored either n the card as risk assessment data or in the terminal. If the transaction falls below that dollar limit it could be automatically approved right at the terminal. If the transaction limit is above that amount, the transaction information may still be sent on to the central processor for further analysis.

If an indicator is present in the first bit map, the analysis will continue for each remaining bit map. The processor will first determine if there are any bit maps remaining that have not been tested (step 107). If there are any bit maps remaining, the processor will generate the index value for the next bit map in step 108. The processor will check to determine if an indicator has been placed in the next bit map of the master table at the location defined by the newly generated index value (step 104). As noted above, if no indicator is present at that location, the card is known to be valid and the transaction can proceed. (step 106)

If indicators are present in all of the bit maps, (i.e. there are no more bit maps left to test and therefore the answer to decision step 107 is "no") there is a possibility that the card is invalid and the information must be routed for further processing as shown in step 110. In this step, an on-line connection can be established to the central processor 30. The transaction information is transmitted to the central processor where it can be further analyzed. The analysis can be made at the central processor if the list of all invalid cards is stored at that location. In the alternative, where the invalid card lists are stored at the issuers 10, the transaction can be rerouted for further analysis at the issuer. If the card is, indeed, invalid, a return message can be given to the terminal to decline the transaction. If, however, the card is valid, the transaction can be approved.

As discussed above, the subject system provides a master table with a large amount of information held in a small space. This approach described herein, however, has an additional advantage. More specifically, in order to check any card against the master file, there is no need to go through the entire table. In the system described in U.S. Pat. No. 3,696,335, where the list of actual account numbers is supplied to the terminal, the account number is compared to each of the numbers in the list in order o determine if the card is listed. Even if more sophisticated binary searching algorithms are used (where lists are arranged in numeric order), a number of comparisons are still necessary. In contrast, in the subject system, only the location in the bit map corresponding to the index value must be checked to determine if an indicator is present. The entire bit map does not have to be reviewed. In a master table having five bit maps, a determination can be made as to whether an account number is present in a universe of 100,000 invalid cards simply by looking at five locations in the master table. If any indicator is missing, the card is known to be valid.

In summary, there has been provided a new and improved system for distributing information about invalid transaction cards. In this system, a master file is created containing less than the entire account number of the cards. The master file consists of at least one bit map having indicators corresponding to invalid cards. The location of each indicator is determined by hashing the account numbers to produce an index value which is then used as an address for supplying the indicator to the bit map. Once indicators have been placed in all the bit maps of the master table for all the invalid account numbers, the master table is then transmitted to the transaction terminals. The transaction terminals which the information in the master table to analyze pending transactions. The information in the table is arranged such that if a potentially invalid card is presented, a signal will be generated which will cause the transaction to be passed onto the central processor for further analysis. In the preferred embodiment, the table is arranged such that the probability of a valid card being identified as potentially invalid is less than ten percent and preferably on the order of one to three percent. In this manner, only a small percentage of valid transactions will be transmitted to the central processor for further analysis as a result of this scheme.

While the subject invention has been described with reference to preferred embodiments, it is apparent that other changes and modifications could be made therein by one skilled in the art without varying from the scope and spirit of the subject invention as defined by the appended claims.

We claim:

1. In a transaction network including a central processor, a plurality of transaction terminals and a plurality of transaction cards, each card having an account number associated therewith, a method for identifying invalid cards comprising the steps of:
   (a) generating a master table at said central processor, said table including at least a first bit map B bits in length;
   (b) selecting a set of digits from the account number of a first invalid transaction card;
   (c) calculating a first index value which is an algorithmic function of said set of digits, said first index value being between zero and B-1;
   (d) placing an indicator within said first bit map corresponding to said first index value;
   (e) repeating steps b though d for each invalid card; and
   (f) supplying the master table to each transaction terminal whereby during a transaction, the transaction terminal determines if an indicator exists in the master table corresponding to the account number of the card presented for the transaction.

2. A transaction network as recited in claim 1 further including the steps at the transaction terminal of:
   repeating steps b and c for the account number of the card presented to generate a first index value;
   determining if an indicator is present in the first bit map at a location corresponding to the generated first index value.

3. A transaction network as recited in claim 2 further including the steps at the transaction terminal of: allowing the transaction to continue unless an indicator is present whereupon the transaction is subjected to further verification.

4. In a transaction network including a central processor, a plurality of transaction terminals and a plurality of transaction cards, each card having an account number associated therewith, a method for identifying invalid cards comprising the steps of:
   (a) generating a master table at said central processor, said table including a plurality of bit maps, each map being B bits in length;
   (b) selecting a set of digits from the account number of a first invalid transaction card;

(c) calculating a first index value which is an algorithmic function of said set of digits, said first index value being between zero and B-1;

(d) placing an indicator within one of said bit maps, said indicator corresponding to said first index value;

(e) repeating steps b and c for each bit map in said master table, each time selecting a unique set of digits from the account number and placing an indicator corresponding to each calculated value in the associated bit map:

(f) repeating steps b though e for each invalid card; and (g) supplying the master table to each transaction terminal whereby during a transaction, the transaction terminal determines if an indicator exists in the master table corresponding to the account number of the card presented for the transaction.

5. A transaction network as recited in claim 4 further including the steps at the transaction terminal of:

repeating steps b and c for each bit map for the account number of the card presented to generate a plurality of values;

determining if indicators are present in each bit map corresponding to the generated values.

6. A transaction network as recited in claim 5 further including the steps at the transaction terminal of:

allowing the transaction to continue unless an indicator is present in each bit map whereupon the transaction is subjected to further verification.

7. In a transaction network including a central processor, a plurality of transaction terminals and a plurality of transaction cards, each card having an account number associated therewith, a method for identifying invalid cards comprising the steps of:

(a) generating a master table at said central processor, said table including data derived from a list of invalid transaction cards, said data being less than the entire account number of each card and including at least one indicator for each invalid card; and (b) supplying the master table to each transaction terminal whereby during a transaction, the transaction terminal determines if an indicator exists in the master table for the account number of the card presented for the transaction and allowing the transaction to continue unless an indicator is present whereupon the transaction will be subjected to further verification.

8. A system as recited in claim 7 wherein the entire master table does not have to be scanned to determine if an indicator exists for the account number of the card presented for the transaction.

9. A data file for use in transaction networks, said data file including information about the account numbers of invalid transaction cards comprising:

a master table including a plurality of bit maps each having B bits; and one indicator in each bit map for each invalid card, each said indicator being at a location corresponding to an index value which is an algorithmic function of a set of digits in the account number of the transaction card.

10. A data file as recited in claim 9 wherein the length of the bit maps in the master table are set with respect to the number of invalid transaction cards such that the probability of an indicator being present in a bit map is approximately 0.4 to 0.5.

11. A data file as recited in claim 10 wherein the number of bit maps in the master table are selected such that the probability of a valid card being represented as an invalid card in the data file is less than ten percent.

12. A data file as recited in claim 10 wherein the number of bit maps in the master table are selected such that the probability of a valid card being represented as an invalid card in the data file is on the order of one to three percent.

13. A transaction system including a central processor and a plurality of transaction terminals and a plurality of transaction cards each having an account number, and with some of said cards being invalid, said system for facilitating off line approval of transactions comprising:

means at said central processor for creating a master table, said master table having a plurality of bit maps, wherein one indicator is provided in each bit map for each invalid transaction card;

means for supplying the master table to each of the transaction terminals; and means at each transaction terminal for determining if an indicator is present in each bit map for the account number of the transaction card being presented.

14. A transaction system as recited in claim 13 wherein said means for supplying the master table to the transaction terminals comprises:

a radio transmitter; and a receiver located at each transaction terminal.

15. A transaction system as recited in claim 13 wherein said means at said central processor generates said master table by selecting sets of digits from the account number of each invalid transaction card and calculating an index value for each set of digits which is an algorithmic function thereof and placing an indicator in individual bit maps at locations corresponding to the calculated index values.

16. A transaction system as recited in claim 15 wherein said transaction terminal selects sets of digits from the account number of the transaction card which has been presented and generates a set of index values and wherein said index values are used to determine if indicators are present in corresponding locations in the bit maps of the master table.

17. A transaction system as recited in claim 16 wherein the transaction terminal allows the transaction to continue unless an indicator is present in each bit map and in that case, the transaction is subjected to further verification.

18. A transaction system as recited in claim 15 wherein the length of each bit map is set with respect to the number of invalid transaction cards such that the probability of an indicator being present in the bit map is approximately 0.4 to 0.5.

19. A transaction system as recited in claim 13 wherein the number of bit maps in the master table are selected such that the probability of a valid card being represented as an invalid card in the data file is less than ten percent.

20. A transaction system as recited in claim 13 wherein the number of bit maps in the master table are selected such that the probability of a valid card being represented as an invalid card in the data file is on the order of one to three percent.

21. A financial transaction system including a central processor and a plurality of transaction terminals and a plurality of transaction cards each having an account number, and with some of said cards being invalid, said system for facilitating off-line approval of transactions comprising:

means at said central processor for creating a master table, said master table having data derived from a list of invalid transaction cards, said data being less than the entire account number of each card and including at least one indicator for each invalid transaction card;

means for supplying the master table to each of the transaction terminals; and means at each transaction terminal for determining if an indicator exists in the master table for the account number of the transaction card being presented and allowing the transaction to continue if no indicator is present and subjecting the transaction to further verification if an indicator is present.

22. A transaction system as recited in claim 21 wherein said means for supplying the master table to the transaction terminals comprises:

a radio transmitter; and a receiver located at each transaction terminal.

23. A transaction system as recited in claim 21 wherein said master table includes a plurality of bit maps and wherein said means at said central processor generates said master table by selecting sets of digits from the account number of each invalid transaction card and calculating an index value for each set of digits which is an algorithmic function thereof and placing an indicator in individual bit maps at locations corresponding to the calculated index values.

24. A transaction system as recited in claim 23 wherein said transaction terminal selects sets of digits from the account number of the transaction card which has been presented and generates a set of index values and wherein said index values are used to determine if indicators are present in corresponding locations in the bit maps of the master table.

25. A transaction system as recited in claim 24 wherein the transaction terminal allows the transaction to continue unless an indicator is present in each bit map and in that case, the transaction is subjected to further verification.

26. A transaction system as recited in claim 23 wherein the length of each bit map is set with respect to the number of invalid transaction cards such that the probability of an indicator being present in the bit map is approximately 0.4 to 0.5.

27. A transaction system as recited in claim 23 wherein the number of bit maps in the master table are selected such that the probability of a valid card being represented as an invalid card in the data file is less than ten percent.

28. A transaction system as recited in claim 23 wherein the number of bit maps in the master table are selected such that the probability of a valid card being represented as an invalid card in the data file is on the order of one to three percent.

29. A transaction system as recited in claim 21 wherein the entire master table does not have to be scanned to determine if an indicator exists for the account number of the transaction card presented for the transaction.

* * * * *

UNITED STATES PATENT AND TRADEMARK OFFICE
CERTIFICATE OF CORRECTION

PATENT NO. : 4,822,985

DATED : April 18, 1989

INVENTOR(S): Elvis W. Boggan and Carl M. Campbell, Jr.

It is certified that error appears in the above - identified patent and that said Letters Patent is hereby corrected as shown below:

Column 3, line 30 is corrected to read as follows:
"provide a compressed data file which will always indi-";

Column 7, line 20 is corrected to read as follows:
"function used to generate a different bit map.";

Column 10, line 11 is corrected to read as follows:
"number would be hashed by the individual terminal and";

Column 11, line 4 is corrected to read as follows:
"pared to a dollar limit stored either on the card as risk";

Column 11, line 47 is corrected to read as follows:
"the list in order to determine if the card is listed.  Even if";

UNITED STATES PATENT AND TRADEMARK OFFICE
CERTIFICATE OF CORRECTION

PATENT NO.  : 4,822,985

DATED       : April 18, 1989

INVENTOR(S) : Elvis W. Boggan and Carl M. Campbell, Jr.

It is certified that error appears in the above-identified patent and that said Letters Patent is hereby corrected as shown below:

Column 12, lines 3 and 4 are corrected to read as follows: "transaction terminals. The transaction terminals then use the information in the master table to analyze pending".

Signed and Sealed this

Eighteenth Day of September, 1990

Attest:

Attesting Officer

HARRY F. MANBECK, JR.

Commissioner of Patents and Trademarks